United States Patent
Kim et al.

(10) Patent No.: US 11,353,228 B2
(45) Date of Patent: Jun. 7, 2022

(54) ELECTRONIC APPARATUS FOR MANAGING HEATING AND COOLING AND CONTROLLING METHOD OF THE SAME

(71) Applicant: LG ELECTRONICS INC., Seoul (KR)

(72) Inventors: Sung Jin Kim, Anyang-si (KR); Beom Oh Kim, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 16/788,074

(22) Filed: Feb. 11, 2020

(65) Prior Publication Data

US 2021/0088244 A1    Mar. 25, 2021

(30) Foreign Application Priority Data

Sep. 19, 2019   (KR) .................. 10-2019-0115652

(51) Int. Cl.
*F24F 11/46*    (2018.01)
*F24F 11/80*    (2018.01)
(Continued)

(52) U.S. Cl.
CPC .............. *F24F 11/46* (2018.01); *F24F 11/56* (2018.01); *F24F 11/64* (2018.01); *F24F 11/65* (2018.01);
(Continued)

(58) Field of Classification Search
CPC .. F24F 11/46; F24F 11/80; F24F 11/64; F24F 11/65; F24F 11/72; F24F 11/56; F24F 2140/60; F24F 2140/50; F24F 2120/12; F24F 2120/14; F24F 2110/10; F24F 11/79; F24F 11/63; G05B 13/027; G06N 3/0454; H04N 13/275
(Continued)

(56) References Cited

U.S. PATENT DOCUMENTS

2010/0063636 A1*   3/2010   Matsumoto .............. F24F 11/30
                                                         700/276
2010/0168922 A1*   7/2010   Park ........................ F24F 11/30
                                                         700/276
(Continued)

FOREIGN PATENT DOCUMENTS

KR   10-2011-0020065 A   3/2011
KR   10-2017-0035628 A   3/2017

*Primary Examiner* — Jigneshkumar C Patel
(74) *Attorney, Agent, or Firm* — Birch, Stewart, Kolasch & Birch, LLP

(57) ABSTRACT

Disclosed is an electronic apparatus capable of managing cooling or heating and a controlling method thereof capable of operating even in the Internet of Things environment through a 5G communication network, and the electronic apparatus of the present disclosure can intensively control cooling or heating in an area where users are dense. The electronic apparatus capable of managing cooling or heating of the present disclosure can acquire a space where the user is located as a 3D structure, learn a distribution of the user distributed in the acquired 3D structure, and then control cooling or heating intensively in the area where the user can be distributed, thereby enabling efficient cooling or heating based on an area requiring the cooling or heating.

15 Claims, 9 Drawing Sheets

(51) Int. Cl.
  *F24F 11/64* (2018.01)
  *F24F 11/65* (2018.01)
  *F24F 11/72* (2018.01)
  *F24F 11/56* (2018.01)
  *G05B 13/02* (2006.01)
  *G06N 3/04* (2006.01)
  *F24F 140/60* (2018.01)
  *F24F 140/50* (2018.01)
  *F24F 120/12* (2018.01)
  *F24F 120/14* (2018.01)
  *F24F 110/10* (2018.01)

(52) U.S. Cl.
  CPC .............. *F24F 11/72* (2018.01); *F24F 11/80* (2018.01); *G05B 13/027* (2013.01); *G06N 3/0454* (2013.01); *F24F 2110/10* (2018.01); *F24F 2120/12* (2018.01); *F24F 2120/14* (2018.01); *F24F 2140/50* (2018.01); *F24F 2140/60* (2018.01)

(58) Field of Classification Search
  USPC ........................................................ 700/278
  See application file for complete search history.

(56) References Cited

U.S. PATENT DOCUMENTS

| | | | |
|---|---|---|---|
| 2011/0056673 A1* | 3/2011 | Jang | F24F 11/62 165/201 |
| 2015/0247647 A1* | 9/2015 | Kusukame | G06K 9/00362 700/276 |
| 2017/0105129 A1* | 4/2017 | Teplin | H04L 41/0806 |
| 2018/0143601 A1* | 5/2018 | Chavan | F24F 11/62 |
| 2018/0329438 A1* | 11/2018 | Letterman | G05D 23/1917 |

* cited by examiner

[FIG. 1]
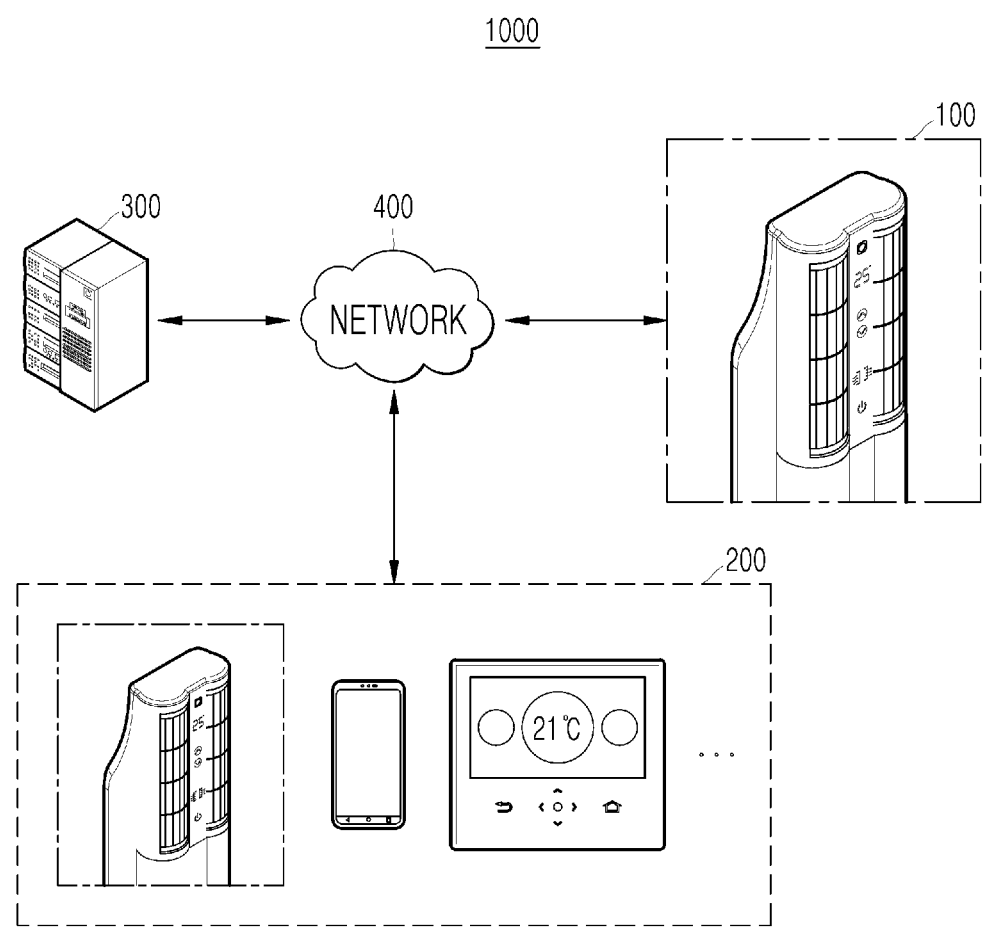

[FIG. 2]
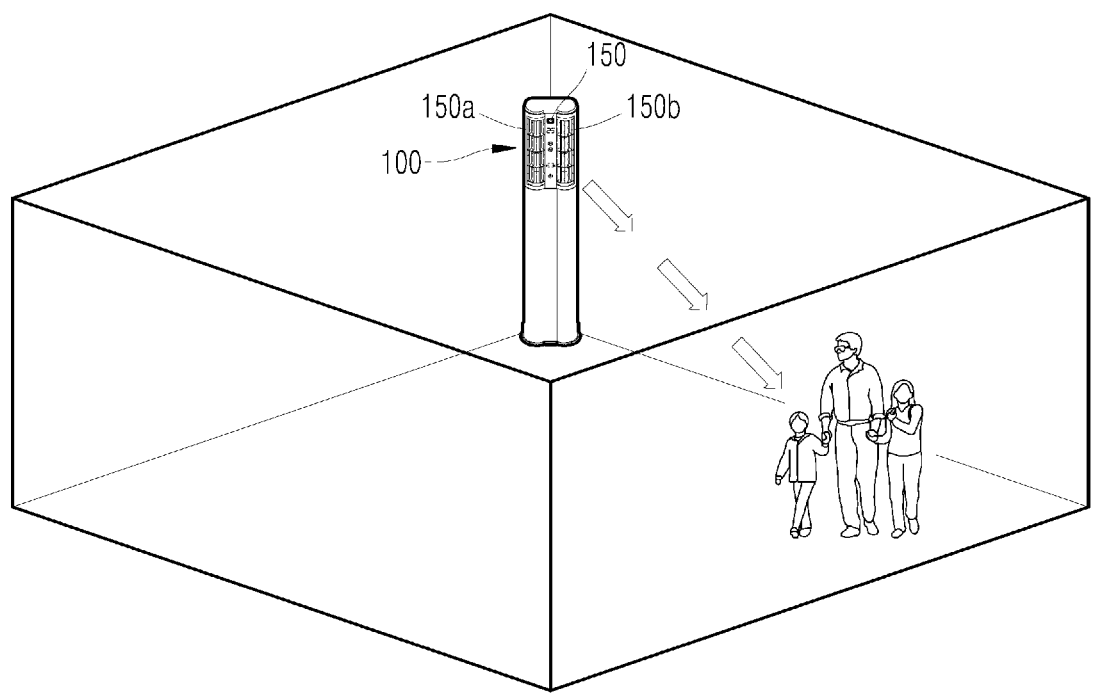

[FIG. 3]
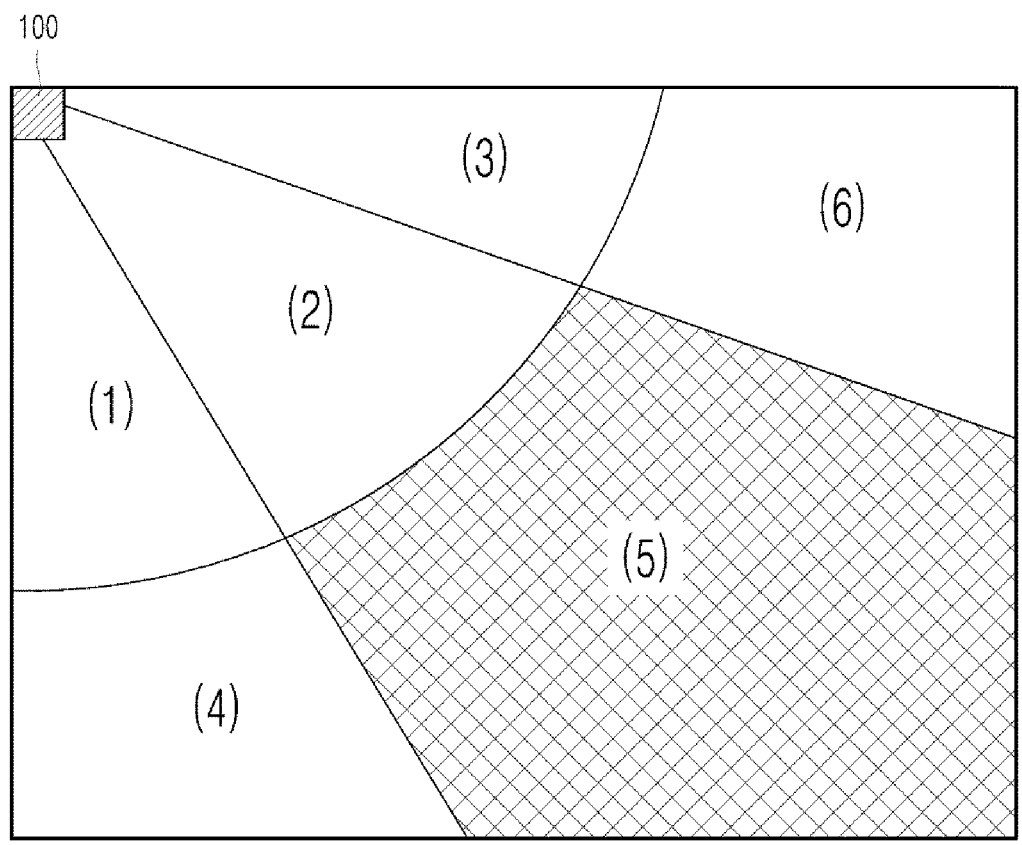

[FIG. 4]
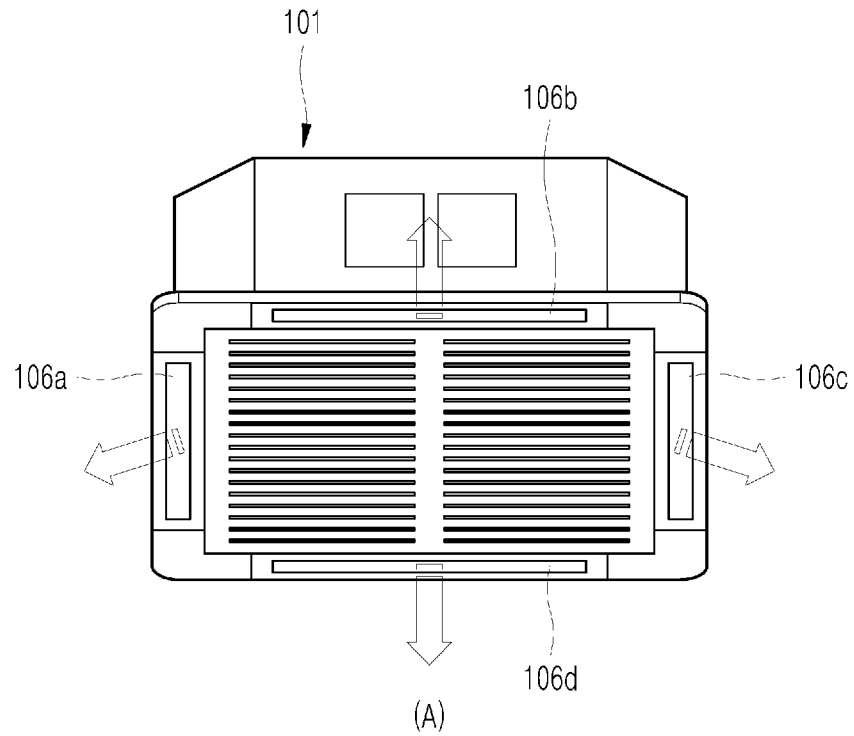
(A)
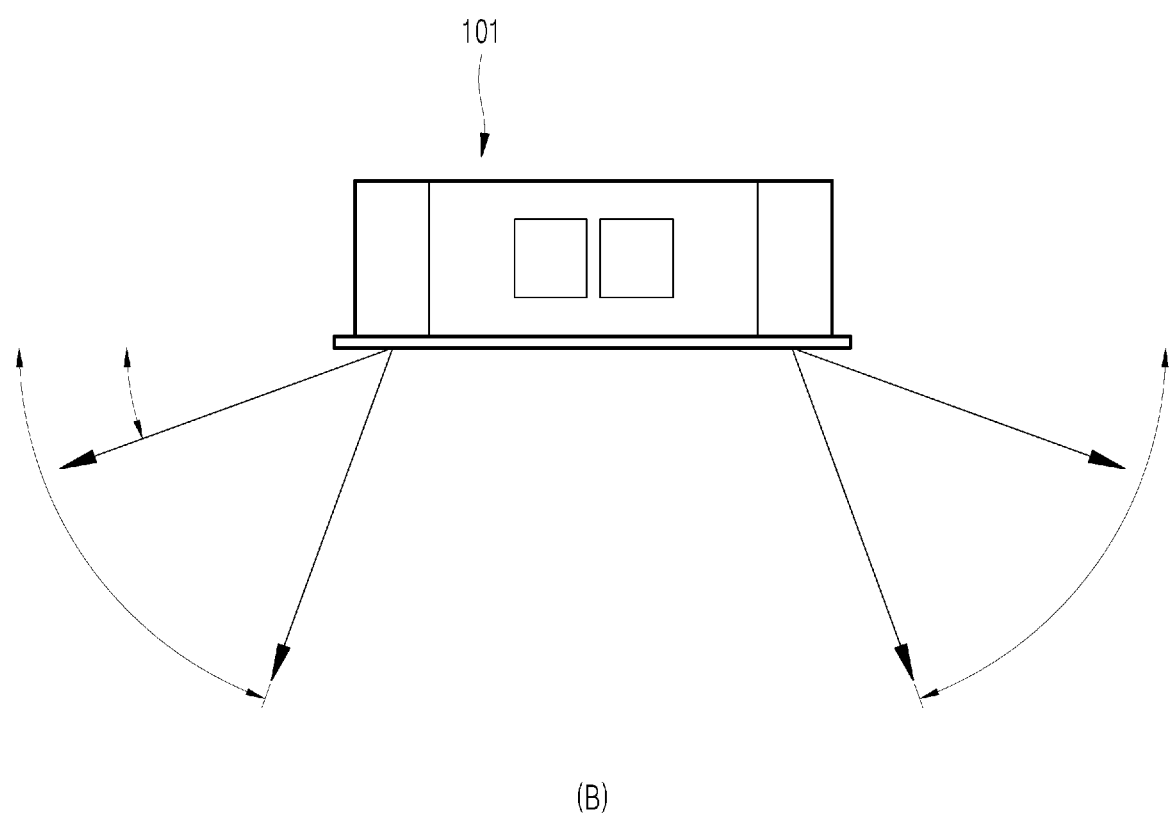
(B)

[FIG. 5]
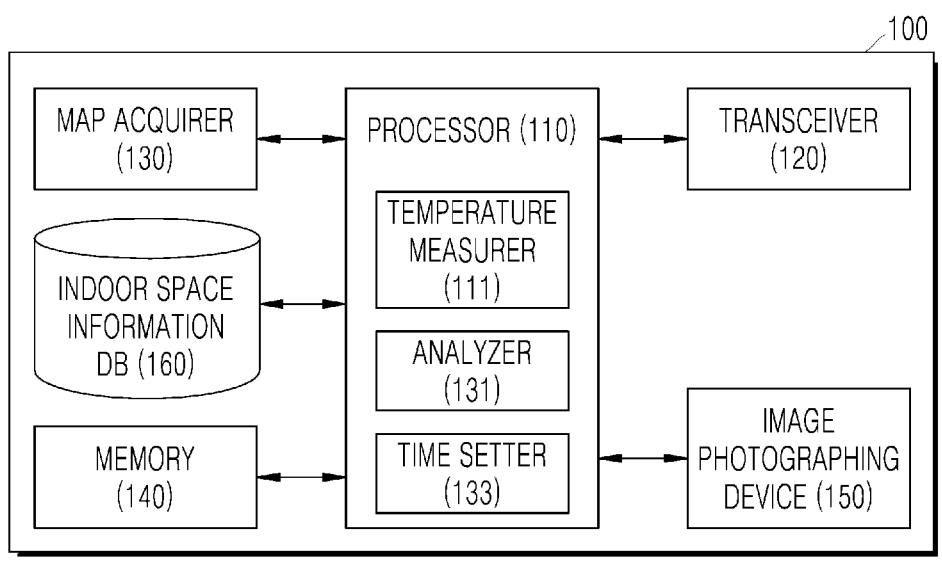

[FIG. 6]
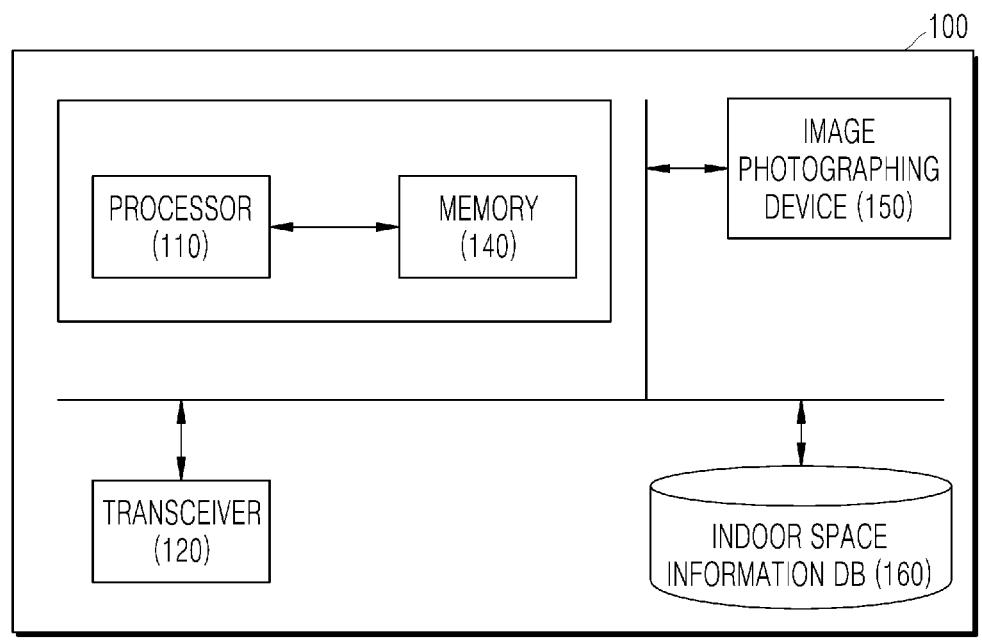

[FIG. 7]
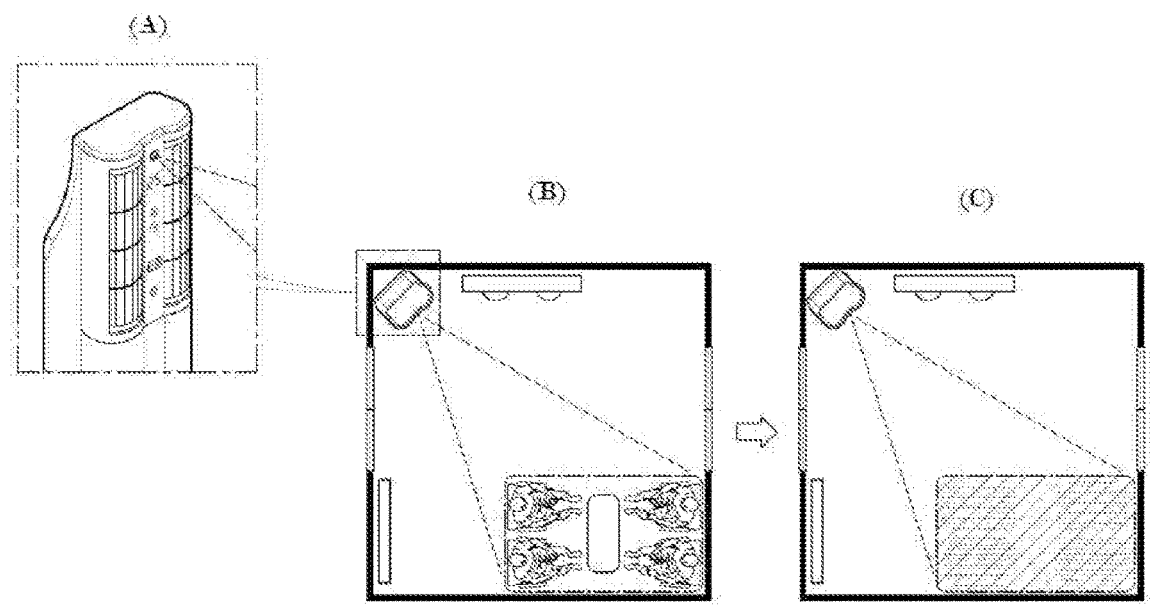

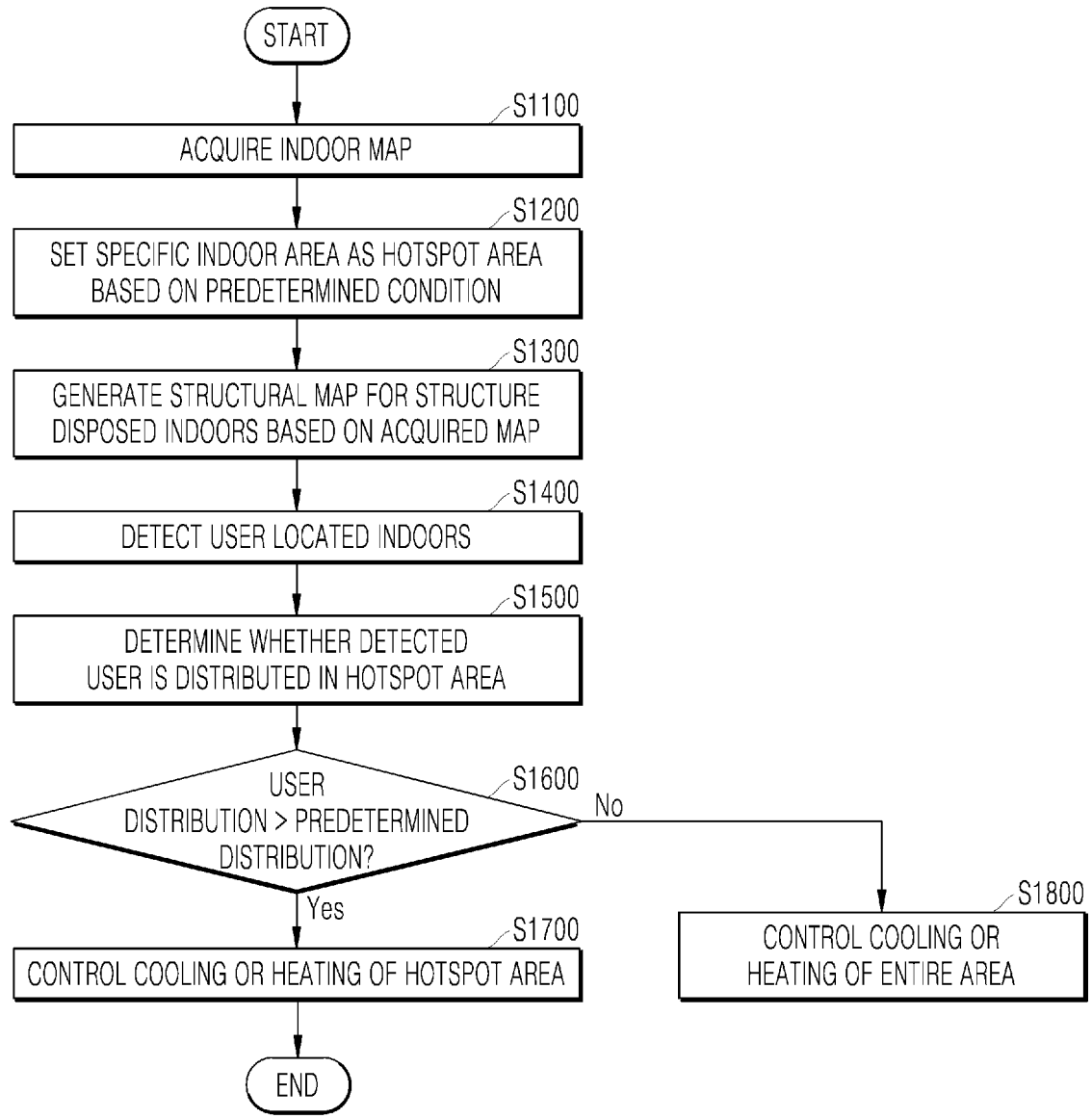
[FIG. 8]

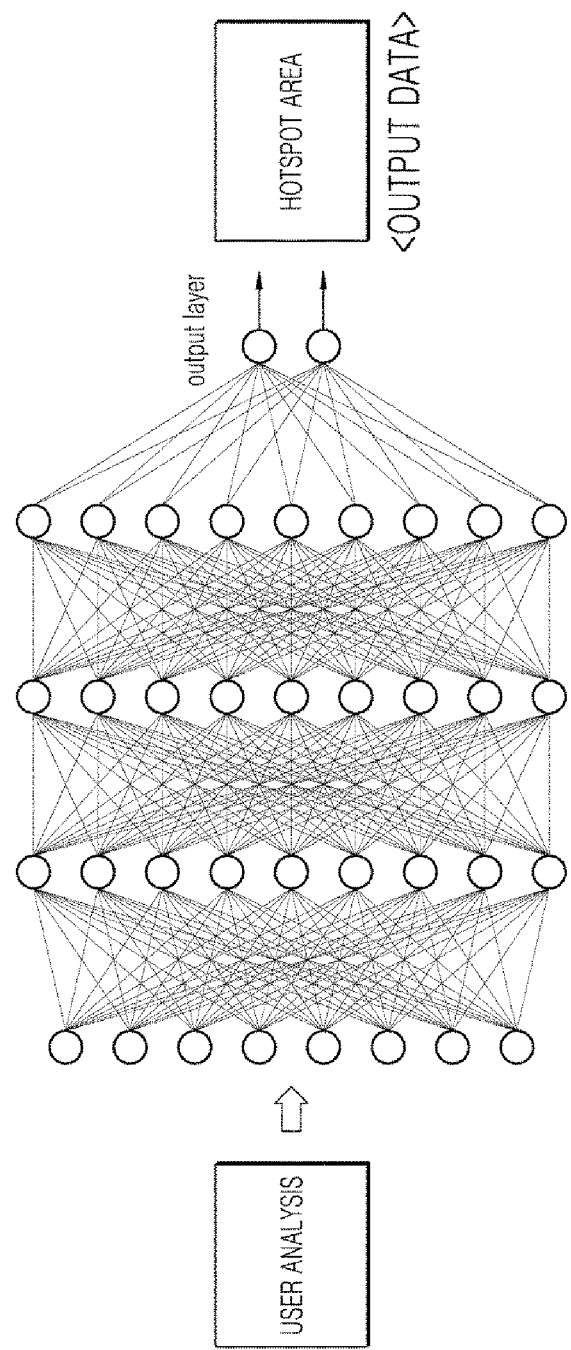
[FIG. 9]

ELECTRONIC APPARATUS FOR MANAGING HEATING AND COOLING AND CONTROLLING METHOD OF THE SAME

CROSS-REFERENCE TO RELATED APPLICATION

This present application claims benefit of priority to Korean Patent Application No. 10-2019-0115652, entitled "ELECTRONIC APPARATUS FOR MANAGING HEATING AND COOLING AND CONTROLLING METHOD OF THE SAME," filed on Sep. 19, 2019, in the Korean Intellectual Property Office, the entire disclosure of which is incorporated herein by reference.

BACKGROUND

1. Technical Field

The present disclosure relates to an electronic apparatus for managing cooling or heating and a controlling method of the same. More particularly, the present disclosure relates to a technique capable of controlling the cooling or heating of a hotspot area generated by distribution of users.

2. Description of Related Art

The following description is only for the purpose of providing background information related to embodiments of the present disclosure, and the contents to be described do not necessarily constitute related art.

A cooling or heating control device that is currently being launched controls an indoor temperature on the basis of a temperature set by a user. That is, a conventional cooling or heating control device blows cold air on the basis of an input set temperature when a user inputs a desired set temperature. In addition, the conventional cooling or heating control device mounts a sensor for sensing the temperature therein and controls the temperature of the blowing wind so as to adjust a temperature close to the desired temperature set by the user through the sensor.

However, the temperature control method of such a cooling or heating control device controls a cold air temperature using a temperature sensor mounted in the cooling or heating control device, and thus there is a problem that a separation between the temperature and an actual temperature felt by the user occurs.

In addition, in order to effectively control the cooling or heating control device, a technique to secure a structure of an interior space where the user is located is required.

As a result, a technique applying a technique capable of controlling cooling or heating based on an area where users are distributed is disclosed in Korea Patent Publication No. 10-2011-0020065 (Related Art 1, published on Mar. 2, 2011) and Korean Patent Application Publication No. 10-2017-0035628 (Related Art 2, published on Mar. 31, 2017).

Specifically, in 'Air-conditioner controlling apparatus and method using infrared camera' of Korean Patent Application Publication No. 10-2011-0020065 (Related Art 1), there is disclosed a technique capable of controlling the direction and intensity of an air conditioning wind depending on a temperature and the distributed number and density of people and controlling a spray direction of the air conditioning wind depending on the movement of the people by photographing the surroundings of a space to be supplied with the air conditioning wind by an infrared camera installed in the air conditioning apparatus to obtain a thermal image and recognizing people by analyzing the acquired thermal image.

However, in the 'air-conditioner controlling apparatus and method using the infrared camera', there is disclosed only a technique capable of controlling the spray direction of the air conditioning wind by analyzing the thermal image obtained by the infrared camera. However, there is not disclosed a technique capable of intensively cooling or heating a dense area easily by securing three-dimensionally an area where the people can be distributed.

In addition, in 'an apparatus and a method for controlling an air-conditioner or an air-heater' of Korean Patent Application Publication No. 10-2017-0035628 (Related Art 2), there is a technique capable of checking an indoor area where a user is located and controlling automatically an air-conditioner or an air-heater so that a user's preferable temperature is maintained in the indoor area.

However, in Related Art 2 above, there is not disclosed a technique capable of intensively cooling or heating a dense area easily by securing three-dimensionally an area where the people can be distributed.

Therefore, there is a need of a technique capable of controlling driving of an electronic apparatus so as to intensively performing cooling or heating in a dense area.

The background art described above can be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An aspect of the present disclosure is to intensively controlling cooling or heating of an area where users are dense.

Further, another aspect of the present disclosure is to control cooling or heating intensively in an area where users can be distributed by acquiring a space where the user is located as a 3D structure and learning a distribution of the user distributed in the acquired 3D structure.

Further, yet another aspect of the present disclosure is to enable efficient cooling or heating based on an area required for cooling or heating by acquiring a space where the user is located as a 3D structure.

An aspect of the present disclosure is not limited to the above-mentioned aspects, and other aspects and advantages of the present disclosure, which are not mentioned, will be understood through the following description, and will become apparent from the embodiments of the present disclosure. It is also to be understood that the aspects of the present disclosure can be realized by means and combinations thereof set forth in claims.

An electronic apparatus at home for managing cooling or heating can acquire an indoor map by an image photographing device, set a specific area of the interior as a hotspot area based on a predetermined condition, generates a structural map in the interior based on the acquired map and the set hotspot area, detect a user located in the interior by the image photographing device to determine whether the user is distributed in the hotspot area, and control cooling or heating of the hotspot area by a control of the electronic apparatus disposed in the interior when the distribution of the user in the hotspot area is a predetermined distribution or more.

Specifically, when controlling the cooling or heating of the hotspot area, the electronic apparatus can measure a temperature in the hotspot area and a temperature in an area other than the hotspot area, analyze a difference between the temperature in the hotspot area and the temperature in the area other than the hotspot area, and control at least a portion of cooling or heating electronic apparatuses disposed in the interior to perform a cooling or heating operation toward the hotspot area when the temperature in the hotspot area has a difference of a predetermined temperature or more from the temperature in the area other than the hotspot area.

Particularly, the temperature in the area other than the hotspot area can be information pre-stored in a memory of the electronic apparatus, and when analyzing the difference between the temperature in the hotspot area and the temperature in the area other than the hotspot area stored in the memory, the electronic apparatus can analyze a difference between the pre-stored temperature in the area other than the hotspot area and the temperature in the hotspot area.

Specifically, when controlling the cooling or heating of the hotspot area, the electronic apparatus can be configured to control the cooling or heating of the hotspot area for a predetermined time, detect the temperature in the hotspot area after the predetermined time, and control at least a portion of cooling or heating electronic apparatuses disposed in the interior to perform a cooling or heating operation toward the hotspot area when the temperature in the hotspot area has a difference of a predetermined temperature or more from the temperature in the hotspot area after the predetermined time.

Further, when controlling the cooling or heating of the hotspot area, the electronic apparatus can be configured to control at least a portion of cooling or heating electronic apparatuses disposed in the interior to perform a cooling or heating operation for the entire interior when the distribution of the user in the hotspot area cannot be determined or the distribution of the user in the hotspot area is less than a predetermined distribution.

Specifically, when controlling the cooling or heating of the hotspot area, the electronic apparatus can be configured to control the cooling or heating of the hotspot area for a predetermined time, detect the temperature in the hotspot area after the predetermined time, and control at least one of cooling or heating electronic apparatuses disposed in the interior to perform a cooling or heating operation for the entire interior when the distribution of the user in the hotspot area cannot be determined or the distribution of the user in the hotspot area is less than a predetermined distribution.

Meanwhile, when acquire the indoor map, the electronic apparatus can acquire the indoor map as a 3D structure by the image photographing device.

Specifically, the indoor map can include an indoor space map and information about shapes and locations of the structures disposed in the interior.

Meanwhile, when setting the hotspot area, the electronic apparatus can determine a hotspot location having a high probability that the user stays for a predetermined time or more based on the shapes and locations of the structures disposed in the interior and set the hotspot area in the indoor map according to the hotspot location.

Further, when setting the hotspot area, the electronic apparatus can input the shapes and locations of the structures disposed indoors in a first neural network model pre-trained so as to predict a probability that the user stays for a predetermined time or more according to a shape and a location of a structure disposed at home and set a location having a probability having a predetermined value or more as the hotspot area according to the output of the first neural network model.

Particularly, when controlling the cooling or heating of the hotspot area, the electronic apparatus can predict a temperature in the hotspot area by a second neural network model pre-trained to predict the temperature of the corresponding area according to the distribution of the user in the interior and control at least a portion of the cooling or heating electronic apparatuses disposed indoors to perform a cooling or heating operation toward the hotspot area based on the output of the second neural network model.

Meanwhile, an electronic apparatus at home for managing cooling or heating according to an embodiment of the present disclosure can be configured by including a map acquirer configured to acquire an indoor map by an image photographing device and a processor configured to set a specific area of the interior as a hotspot area based on a predetermined condition, generate a structural map in the interior based on the acquired map and the set hotspot area, detect a user located in the interior by the image photographing device, determine whether the user is distributed in the hotspot area, and control cooling or heating of the hotspot area by a control of the electronic apparatus disposed in the interior when the distribution of the user in the hotspot area is a predetermined distribution or more.

Specifically, the processor can include a temperature measurer configured to measure a temperature in the hotspot area and a temperature in an area other than the hotspot area and an analyzer configured to analyze a difference between the temperature in the hotspot area and the temperature in the area other than the hotspot area.

At this time, the processor can control at least a portion of cooling or heating electronic apparatuses disposed in the interior to perform a cooling or heating operation toward the hotspot area when the temperature in the hotspot area has a difference of a predetermined temperature or more from the temperature in the area other than the hotspot area.

Further, the processor can include a memory in which information about the temperature in the area other than the hotspot area is stored, and the analyzer can analyze a difference between the temperature in the area other than the hotspot area stored in the memory and the temperature in the hotspot area.

Further, the processor can control at least a portion of cooling or heating electronic apparatuses disposed in the interior to perform a cooling or heating operation for the entire interior when the distribution of the user in the hotspot area cannot be determined or the distribution of the user in the hotspot area is less than a predetermined distribution.

Particularly, the map acquirer can acquire the indoor map as a 3D image by the image photographing device.

Specifically, the indoor map can include an indoor space map and information about shapes and locations of the structures disposed in the interior.

Meanwhile, an electronic apparatus at home for managing cooling or heating according to an embodiment of the present disclosure can include at least one processor and a memory connected to the processor.

At this time, the memory can store commands configured to acquire an indoor map by an image photographing device, set a specific area of the interior as a hotspot area based on a predetermined condition, generate a structural map in the interior based on the acquired map and the set hotspot area, detect a user located in the interior by the image photographing device, determine whether the user is distributed in the hotspot area, and control cooling or heating of the hotspot area by a control of the electronic apparatus disposed in the interior when the distribution of the user in the hotspot area is a predetermined distribution or more, when executed by at least one processor.

Other aspects and features than those described above will become apparent from the following drawings, claims, and detailed description of the present disclosure.

According to the present disclosure, it is possible to intensively controlling cooling or heating of an area where users are dense. Particularly, it is possible to intensively control cooling or heating of a hotspot area where the user is mainly distributed based on the photographed image or the user is mainly distributed based on learning data after learning a living area.

Further, according to the present disclosure, it is possible to control cooling or heating intensively in an area where users can be distributed by acquiring a space where the user is located as a 3D structure and learning a distribution of the user distributed in the acquired 3D structure. As a result, the cooling is prevented in an area where the cooling is not required according to a furniture displacement or an indoor space structure, thereby performing more efficient cooling.

Particularly, the space where the user is located can be acquired as a 3D structure to enable efficient cooling or heating based on an area where the cooling or heating is required.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is an exemplary view required for describing an electronic apparatus for managing cooling or heating according to an embodiment of the present disclosure;

FIG. 2 is an exemplary view required for describing a displacement of the electronic apparatus according to an embodiment of the present disclosure;

FIG. 3 is a view illustrating an example for describing a cooling or heating control of the electronic apparatus according to an embodiment of the present disclosure;

FIG. 4 is an exemplary view required for describing a displacement of an electronic apparatus according to another embodiment of the present disclosure;

FIG. 5 is a block view illustrating a schematic configuration of the electronic apparatus according to an embodiment of the present disclosure;

FIG. 6 is a block view illustrating a schematic configuration between a processor and a memory of FIG. 5;

FIG. 7 is a view schematically illustrating a cooling or heating control process of the electronic apparatus according to an embodiment of the present disclosure;

FIG. 8 is a flowchart of a controlling method of an electronic apparatus according to an embodiment of the present disclosure; and FIG. 9 is a view for describing a deep neural network model for determining the control of an electronic apparatus according to an embodiment of the present disclosure.

DETAILED DESCRIPTION OF THE EMBODIMENTS

Hereinafter the embodiments disclosed in this specification will be described in detail with reference to the accompanying drawings. The present disclosure can be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like can be used herein to describe various elements, these elements should not be limited by these terms. These terms can be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

An electronic apparatus of the present disclosure can be an apparatus capable of controlling indoor cooling or heating, for example, any one of an air conditioner, a heat pump, a heater, and the like. Here, the heat pump can be related with an action of absorbing heat in a low temperature range, for example, air, heat of ground water, and waste heat to pump up the heat in a high temperature range.

Hereinafter, for convenience of the description below, an electronic apparatus capable of controlling an indoor temperature according to an embodiment of the present disclosure is described as, for example, an air conditioner, but the present disclosure is not limited by limiting the electronic apparatus.

In addition, embodiments of the present disclosure are described based on an embodiment of controlling driving of an air conditioner, but a plurality of air conditioners, a plurality of cooling and heating controller, and a plurality of heaters can be controlled at the same time.

FIG. 1 is an exemplary view required for describing an electronic apparatus for managing cooling or heating according to an embodiment of the present disclosure, FIG. 2 is an exemplary view required for describing a displacement of the electronic apparatus according to an embodiment of the present disclosure, FIG. 3 is a view illustrating an example for describing a cooling or heating control of the electronic apparatus according to an embodiment of the present disclosure, and FIG. 4 is an exemplary view required for describing a displacement of an electronic apparatus according to another embodiment of the present disclosure.

Referring to FIG. 1, an electronic apparatus 1000 according to an embodiment of the present disclosure includes an air conditioner 100 managing indoor cooling, a central controller 300 controlling the air conditioner 100, an information provider 200 connected to the central controller 300 and providing information about an indoor space where a user is located so as to control the driving of the air conditioner 100, and a network 400 connecting the air conditioner 100, the information provider 200, and the central controller 300.

The air conditioner 100 can control indoor air. The indoor space where the air conditioner 100 is disposed is, for example, a home interior, and at home where the air conditioner 100 is disposed, various electronic apparatuses can be configured to communicate with each other under an IoT environment implemented through 5G communication.

Further, the air conditioner 100 can control the temperature by cooling the indoor space and control the humidity of the air through a dehumidifying or humidifying function, and perform a function of filtering dust and gas in the air by adding an air cleaning function.

The central controller 300 can be connected to the air conditioner 100 to control and monitor the operation thereof. In addition, the central controller 300 can set an operation schedule of the air conditioner 100, and control an indoor unit of the air conditioner 100 and an area other than a hotspot area so as to operate the air conditioner 100 according to the set schedule. In addition, the central controller 300 can include a single device or can be composed of a plurality of devices, and in the case of the plurality of devices, the central controller 300 can include a hub, a centralized power meter advance control platform (ACP), a management server installed with a management program, and the like.

The information provider 200 is connected to the central controller 103 using wired and wireless communications so that an air conditioner control service and a monitoring service provided by the central controller 300 is performed through a web or an application. That is, the information provider 200 can provide information about the user which is located in the indoor space so that the driving of the air conditioner 100 is controlled by the central controller 300 in a remote place spaced apart from the indoor space. To this end, the information provider 200 can be implemented as an image photographing device such as a camera mounted on the main body of the air conditioner 100, a personal mobile communication device, a thermometer capable of measuring the temperature of the indoor space in real time, and the like.

The network 400 serves to connect the air conditioner 100, the central controller 300, and the information provider 200 for the control by the central control and the external connection.

Specifically, the network 400 can include a wired network such as a local area network (LAN), a wide area network (WAN), a metropolitan area network (MAN), or an integrated service digital network (ISDN), and a wireless network such as wireless LANs, a CDMA, Bluetooth®, or satellite communication, but the scope of the present disclosure is not limited to these examples.

Furthermore, the network 400 can transmit/receive information using short-range communications and/or long-distance communications. Examples of the short-range communication technologies can include Bluetooth, radio frequency identification (RFID), infrared data association (IrDA), ultra-wideband (UWB), ZigBee, and wireless fidelity (Wi-Fi). Examples of the long-range communication technologies can include code division multiple access (CDMA), frequency division multiple access (FDMA), time division multiple access (TDMA), orthogonal frequency division multiple access (OFDMA), and single carrier frequency division multiple access (SC-FDMA).

The network 400 can include a connection of network elements such as a hub, a bridge, a router, a switch, and a gateway. The network 400 can include one or more connected networks, for example, a multi-network environment, including a public network such as an internet and a private network such as a safe corporate private network. The access to the network 400 can be provided via one or more wired or wireless access networks. Further, the network 400 can support 5G communication and/or an Internet of things (IoT) network for exchanging and processing information between distributed components such as objects.

In addition, the central controller 300 and the air conditioner 100 can be connected via the network 400 such as building automation control networks (BACnet). In this case, a gateway and the like can be further included.

On the other hand, the air conditioner 100 comprises a ceiling type, a stand type, and a wall-mounted type according to an installed location. The air conditioner 100 according to an embodiment of the present disclosure performs intensively cooling in an area where users located in the indoor space are distributed. In other words, the air conditioner 100 controls a discharge angle of a discharge port through which cool air is discharged and controls the driving of the air conditioner 100 to adjust a discharging amount of the cool air.

Referring to FIG. 2, a stand-type air conditioner 100 according to an embodiment of the present disclosure is illustrated. The stand-type air conditioner 100 can be installed in an indoor corner area, face the interior, and include a plurality of discharge ports 150*a* and 150*b* capable of moving up/down or left/right. In addition, an amount of air discharged through the plurality of discharge ports 150*a* and 150*b* and angles of the discharge ports 150*a* and 150*b* can be independently controlled, respectively.

Referring back to FIG. 2, an area where the user is distributed in the indoor space can be photographed by an image photographing device 150 mounted on the stand-type air conditioner 100 to obtain a map of the interior. A structural map for a plurality of structures disposed indoors can be generated based on the photographed map.

In addition, the image photographing device 150 can detect the user located indoors. The image photographing device 150 can determine whether the detected user is distributed in a hotspot area set based on a predetermined condition and provides cool air toward the hotspot area when it is determined that the user is distributed in the hotspot area so that the air conditioner 100 does not discharge the cool air to a ceiling or wall surface where the user is not distributed.

Here, the hotspot set by the predetermined condition is set based on learned data after learning an area where the user is mainly distributed or lives based on the picture and image photographed by the image photographing device 150, but conditions setting the hotspot area can be changed.

At this time, the amount of the cool air discharged from the discharge ports 150*a* and 150*b* of the air conditioner 100 and the angles of the discharge ports can be changed according to a condition. For example, when the number of users distributed in the indoor space is equal to or more than a predetermined number, the cool air can be provided to the space where the users are distributed. More specifically, when the number of users distributed in the indoor space is 3 or more, the cool air is discharged to an area where the users are dense. Further, when the number of users distributed in the indoor space is 5 or more, intensive cooling in the indoor space can be performed by increasing the amount of cool air discharged from the discharge ports. Similarly, when the temperature of the indoor space is higher than a predetermined temperature, the cooling in the indoor space can be performed by discharging the cool air to the indoor space.

At this time, the indoor space is photographed by the image photographing device 150 mounted on the air conditioner 100 to adjust the angles of the discharge ports to the area where the users are dense based on the photographed image. As a result, the intensive cooling can be performed based on the area where the users are dense.

That is, referring to FIG. 3, the indoor space can be partitioned around the stand-type air conditioner 100 according to any condition. Conditions for partitioning the indoor space can be varied depending on various furniture disposed in the indoor space photographed, a structure of the indoor space, and the like by the image photographing device 150.

In the indoor space partitioned above, when the users are dense in a space 5 or the user distribution is higher than the user distribution of the predetermined conditions, the stand-type air conditioner 100 discharges air toward the space 5. In other words, the space 5 is intensively cooled so that the user can more comfortably use the indoor space.

Meanwhile, referring to FIG. 4, a ceiling-type air conditioner 101 is illustrated. The ceiling-type air conditioner 101 includes discharge ports 106*a*, 106*b*, 106*c*, and 106*d* in a plurality of directions, for example, four directions. In addition, in the ceiling-type air conditioner 101, the discharge amounts and the discharge angles of the air discharged through the respective discharge ports 106*a*, 106*b*, 106*c*, and 106*d* can be controlled independently of each other.

Specifically, in the four discharge ports 106*a*, 106*b*, 106*c*, and 106*d*, if a first discharge port 160*a* is a discharge port facing the indoor wall surface and a third discharge port 106*c* is a discharge port facing the indoor center, the driving of the first discharge port 160*a* can be controlled so that the air is not discharged to the first discharge port 160*a*. On the other hand, the third discharge port 106*c* can be controlled so that the air can be discharged to the maximum.

Meanwhile, an indoor map is obtained by photographing the area where the users are distributed in the indoor space by the image photographing device 150 mounted on the air conditioner 100, a structural map for a plurality of structures disposed indoors is generated based on the photographed map, and then the air conditioner 100 can discharge the air to the entire interior when the distribution of the users cannot be determined or it is determined that the user distribution in the hotspot area is less than the predetermined distribution.

At this time, rotational ranges and settings of the discharge ports 106*a*, 106*b*, 106*c*, and 106*d* can be changed based on the structural map obtained by the image photographing device 150 and set based on conditions of higher cooling efficiency.

FIG. 5 is a block view illustrating a schematic configuration of the electronic apparatus according to an embodiment of the present disclosure and FIG. 6 is a block view illustrating a schematic configuration between a processor and a memory of FIG. 5. Hereinafter, a description of components that are identical to the components described with reference to FIGS. 1 to 4 will be omitted.

According to the embodiment of the present disclosure, the air conditioner 100 of the electronic apparatus 1000 capable of managing cooling or heating can be configured to include a map acquirer 130 and a processor 110.

The map acquirer 130 is configured to acquire an indoor map. Specifically, the indoor map can mean an indoor space map and information about types and locations of the structures disposed indoors.

At this time, the map acquirer 130 can acquire the indoor map by the image photographing device 150, and specifically, the image photographing device 150 can be a device capable of photographing an image, such as a camera and a CCTV. More specifically, the image photographing device 150 of the embodiment of the present disclosure can be a camera mounted on the air conditioner 100.

Here, the camera can include at least one optical lens, an image sensor (for example, a CMOS image sensor) which includes a plurality of photodiodes (for example, pixels) forming an image using the light passing through the optical lens, and a digital signal processor (DSP) for forming an image based on signals outputted from the photodiodes. The digital signal processor can generate a moving picture constituted by frames consisting of still images as well as still images.

Such an image photographing device 150 can photograph the indoor map as a 3D image. As a result, the cooling is prevented in an area where the cooling is not required according to a furniture displacement or an indoor space structure, thereby performing more efficient cooling.

In addition, it is possible to clearly recognize presence or absence of users which are located in the interior. Usually, it is determined whether the user is located in the interior by an infrared sensor, a thermal image sensor or the like to recognize the presence or absence of the user. However, according to an embodiment of the present disclosure, it is possible to clearly determine the presence or absence of the user by acquiring the indoor image as the 3D image. As a result, it is possible to perform intensive cooling in an area where the users are distributed or the users are dense.

In order to perform intensive cooling or heating in a specific area of the interior acquired above, the specific area of the interior needs to be set as a hotspot area based on a predetermined condition.

Specifically, the hotspot area can refer to an area where there is a high possibility that the users are to be dense or an area where there is a high probability that the users are mainly to be distributed based on the picture and image photographed by the image photographing device 150 and can be set through learning.

A structural map of a plurality of structures disposed indoors is generated based on the hotspot area set above and the indoor map structure and users located indoors can be detected by the image photographing device 150. Then, when the user distribution in the hotspot area is equal to or higher than a predetermined distribution, the user controls cooling or heating in the hotspot area.

As described above, the hotspot area can be set and learned based on a predetermined condition. When the users are distributed in the learned hotspot area and the distribution of the distributed users is higher than the predetermined distribution, the user controls the cooling or heating in the area where the users are distributed to allow users to keep indoor activities in a more pleasant environment.

In this case, the learning data can be stored in an indoor space information DB 160. In addition, data about a structure of the indoor space (e.g., furniture displacement, interior structure and shape, etc.) can be stored in the indoor space information DB 160.

On the other hand, in the embodiment of the present disclosure, an example for cooling the hotspot area is described, but it is natural to allow user to control the heating in the hotspot area by controlling a heating electronic apparatus disposed indoors so as to minimize inconvenience due to heating when the user moves in the indoor space.

In particular, in the case of controlling the heating in the hotspot area, when an outdoor temperature is a predetermined temperature or less, the intensive heating is performed around the learned hotspot area so that the inconvenience due to heating does not occur when the user moves indoors.

In order to intensively cool the hotspot area, the processor 110 can include a temperature measurer 111 and an analyzer 131.

Specifically, the temperature measurer 111 can measure a set temperature of the hotspot area and a temperature in an area other than the hotspot area. For example, when the temperature in the hotspot area is higher than the temperature in the area other than the hotspot area, the hotspot area is intensively cooled.

Here, when the temperature in the hotspot area measured by the temperature measurer 111 is different from the temperature of the learned hotspot area, it is also possible to control the cooling or heating of the hotspot area measured by the temperature measurer 111. That is, the user presets an average temperature in the hotspot area where the user mainly moves and controls a heating or cooling electronic apparatus disposed indoors when the temperature in the hotspot area measured by the temperature measurer 111 is higher or lower than a predetermined average temperature.

At this time, the area other than the hotspot area can be any one of an outdoor area, a furnished area, an area near columns in a building where the users are not dense, a corner area, and the like. Such an area other than the hotspot area can be learned based on the image photographed by the image photographing device 150 and the area other than the learned hotspot area can be stored in a memory 140 to be described below.

The analyzer 131 analyzes a difference between the temperature in the hotspot area and the temperature in the area other than the hotspot area. That is, the analyzer 131 analyzes whether the difference between the temperature in the hotspot area and the temperature in the area other than the hotspot area occurs to a certain extent. At this time, when the difference between the temperature in the hotspot area and the temperature in the area other than the hotspot area is equal to or higher than a predetermined temperature difference, the hotspot area is intensively cooled to minimize the difference between the temperature in the hotspot area and the temperature in the area other than the hotspot area.

Further, information about the temperature in the area other than the hotspot area can be pre-stored in the processor 110. As described above, a temperature in the furnished area or the area where the users are not distributed can be measured and an average temperature can be stored. The analyzer 131 can analyze a difference between the stored average temperature in the area other than the hotspot area and the temperature in the hotspot area measured by the temperature measurer 111.

For example, when the difference between the temperature in the hotspot area and the temperature in the area other than the hotspot area is 3 degrees or more, the hotspot area can be intensively cooled, but the difference between the temperature in the hotspot area and the temperature in the area other than the hotspot area can be changed according to a condition.

In addition, the image photographing device 150 can detect the user located indoors to set the hotspot area. In other words, the image photographing device 150 detects an area where the user is mainly located in the image photographed while photographing the interior.

When the user is detected above, a location where the user is detected is set as a hotspot area of the user.

Specifically, when the image photographing device 150 photographs furniture disposed indoors or an indoor structure, the photographed picture and image can be included together with the user. An area where the user is mainly located is determined in the furniture and structure in the photographed picture and image and the determined area where the user is mainly located can be set as a hotspot area.

Further, in order to set the hotspot area, the image photographing device 150 can determine whether the location where the user is detected is adjacent to a central area of the interior. That is, in general, users are mainly living in the indoor center. Thus, it can be determined whether the user is located in the indoor center which mainly lives by the image photographed by the image photographing device 150.

If it is determined that the location where the user is detected is adjacent to the indoor center by the image photographing device 150, the processor 110 can set the central area of the interior as the hotspot area.

When this hotspot area is set, the processor 110 can intensively cool the set hotspot area. At this time, the processor 110 can intensively cool the hotspot area for a predetermined time. To this end, the processor 110 can include a time setter 133 where the predetermined time is stored.

Generally, even when the difference between the temperature in the hotspot area and the temperature in the area other than the hotspot area does not greatly occur and cooling is required by a difference between outdoor and indoor temperatures, it is determined that the cooling is not required while the cooling continues for the predetermined time. Therefore, it is possible to stop intensive cooling (or intensive heating) of the hotspot area to reduce the inconvenience of the user due to the cooling.

When the cooling or heating in the hotspot area is controlled for a predetermined time, a temperature in the hotspot area can be determined after the predetermined time. In this process, after the predetermined time, the temperature in the hotspot area can have a difference of a predetermined temperature or more. In this case, at least a portion of the cooling or heating the electronic apparatus disposed in the interior can control the cooling or heating of the hotspot area.

Meanwhile, when the cooling or heating of the hotspot area is controlled, the user distribution in the hotspot area cannot be determined or the user distribution in the hotspot area can be less than a predetermined distribution. In this case, any one of the cooling or heating electronic apparatuses disposed indoors can control the cooling or heating in the entire interior.

Particularly, as described above, when the cooling or heating of the hotspot area is controlled for a predetermined time, after the predetermined time, when the temperature of the hotspot area is detected and when the cooling or heating of the hotspot area is controlled, the user distribution in the hotspot area cannot be determined or the user distribution in the hotspot area can be less than a predetermined distribution. Even in this case, any one of the cooling or heating electronic apparatus disposed in the interior can control the cooling or heating in the entire interior.

Further, when the hotspot area is set, a location of a hotspot having a high probability that the user stays for a predetermined time can be determined based on a shape and a location of the structure disposed in the interior. Specifically, the hotspot location can refer to a location around the structure where the user stays when the user stays for a time (e.g., 10 minutes) or more stored in a specific structure (e.g., sofa).

The hotspot location determined above can be set as a hotspot area to be learned and stored, and when the user stays at the hotspot location for a predetermined time, the cooling or heating electronic apparatus is controlled based on the stored information to control the indoor cooling or heating.

Meanwhile, information about a hotspot setting condition for setting the specific location of the interior as the hotspot, a control condition of the hotspot area so as to control the cooling or heating when the hotspot area is set, and the like can be stored in the memory 140.

Specifically, in the memory 140, shapes and locations of the structures disposed indoors can be input in a first neural network model pre-trained so as to predict a probability that the user stays for a predetermined time or more according to a shape and a location of a structure disposed at home. For example, an area where the users are dense, an area where there are a lot of activities of the user, and the like can be labeled and stored.

A location having a probability of a predetermined value or more can be set as the hotspot area according to an output of the first neural network model based on the learning data set stored above.

In addition, in order to control cooling or heating in the hotspot area, a temperature in the hotspot area can be predicted by a second neural network model pre-trained to predict a temperature of the corresponding area according to a user distribution in the interior.

When the temperature in the hotspot area is predicted, at least a portion of the cooling or heating electronic apparatus disposed indoors can be controlled to perform a cooling or heating operation toward the hotspot area based on the output from the second neural network model.

Such learning can be performed in the electronic apparatus itself, but can be performed in the outside other than the electronic apparatus, and only information about the hotspot area derived as a result of learning can be delivered and stored in the electronic apparatus.

Further, the memory 140 can include volatile or nonvolatile recording media that records various information required for controlling the electronic apparatus by a noise manageable electronic apparatus. The recording medium can include a hard disk drive (HDD), a solid state disk (SSD), a silicon disk drive (SDD), a ROM, a RAM, a CD-ROM, a magnetic tape, a floppy disk, a light data storage device, and the like, which store data readable by the processor 110. In the present embodiment, the information stored in the memory 140 will be described for each situation according to the context.

In the embodiment of the present disclosure, an example in which information about noise information of the electronic apparatus stored in the memory 140 is received from an external server (not illustrated) will be described. The server can be a database server which provides big data required for applying various artificial intelligence algorithms, data on speech recognition, and the like. In addition, the server can include a web server or an application capable of controlling an electronic apparatus remotely via a transceiver 120 communicating with an application or a web browser installed in the electronic apparatus.

That is, it is possible to control cooling or heating in the hotspot area set based on information about the hotspot stored in the central controller 300, an indoor temperature set by the user, and the like.

Meanwhile, the electronic apparatus according to an embodiment of the present disclosure includes one or more processors, and the memory can be connected with one or more processors.

At this time, the memory 140 can store commands that acquires an indoor map from the image photographing device 150 when executed by one or more processors, determines the user distribution in the interior based on the map, sets a hotspot area when the user distribution is a predetermined distribution or more, and then controls the cooling or heating in the set hotspot area.

That is, the commands for driving the map acquirer 130, the transceiver 120, the image photographing device 150, etc. described above can be driven by a single processor, but alternatively, can be driven by a plurality of processors connected with each configuration.

Meanwhile, the processor 110 can further include a learning processor 110 to train a machine learning model in the memory 140, an analysis processor 110 analyzing whether there is a hotspot area based on a determination program determining the hotspot area, and a driving processor 110 capable of controlling cooling or heating in the hotspot area analyzed by the analysis processor 110.

Thus, the processor 110 for controlling the cooling or heating of the hotspot area can include all types of devices capable of processing data. Here, the 'processor' can, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like can be included, but the scope of the present disclosure is not limited thereto.

Meanwhile, the electronic apparatus such as the air conditioner 100 can further include the transceiver 120. The transceiver 120 can provide a communication interface required for providing transmission and reception signals between the air conditioner 100 and other electronic apparatuses and/or devices such as a personal mobile communication device and a thermometer in a data form in conjunction with network 400. Furthermore, the transceiver 120 can receive signals requesting predetermined information from the electronic apparatuses and/or the devices such as a personal mobile communication device and a thermometer and can also transmit information processed by the electronic apparatus 1000 to other electronic apparatuses and/or devices such as a personal mobile communication device and a thermometer. The transceiver 120 can be a device that includes hardware and software required for transmission/reception of signals such as control signals, data signals, and so forth, with other network devices through wire-based or wireless connections.

FIG. 7 is a view schematically illustrating a cooling or heating control process of the electronic apparatus according to an embodiment of the present disclosure. Hereinafter, a description of components that are identical to the components described with reference to FIGS. 1 to 6 will be omitted.

Referring to FIG. 7, according to the embodiment of the present disclosure, in order to control a temperature of the hotspot area where the users mainly move or are dense and distributed, first, an interior is photographed by the image photographing device 150 of the air conditioner 100 disposed indoors ((A) of FIG. 7).

Meanwhile, a specific area in the interior is set as the hotspot area based on a predetermined condition, and cooling or heating in the hotspot area can be controlled when the user distribution in the hotspot area is a predetermined distribution or more based on the set hotspot area ((B) and (C) of FIG. 7).

At this time, the hotspot area can refer to an area where the user mainly moves, an area where the users are dense, and the like and can be pre-learned by the image or picture photographed by the image photographer, etc.

In other words, while the hotspot area is learned, when the temperature of the hotspot area set by the image photographing device 150 is a predetermined temperature or more or less, the cooling or heating of the hotspot area is controlled by driving the cooling or heating device.

FIG. 8 is a flowchart of a controlling method of an electronic apparatus according to an embodiment of the present disclosure and FIG. 9 is a view for describing a deep neural network model for determining the control of an electronic apparatus according to an embodiment of the present disclosure. Hereinafter, a description of components that are identical to the components described with reference to FIGS. 1 to 7 will be omitted.

Referring to FIGS. 8 and 9, in order to control an internal temperature of the hotspot area where the users located in the interior mainly move or are dense and distributed, first, information about a space where the users move can be checked.

Specifically, a map for an indoor structure can be acquired by a photographing device such as a camera and a CCTV installed indoors and the image photographing device 150 installed in the air conditioner 100, a heater, and the like (S1110). Such an image photographing device 150 can photograph the indoor map as a 3D image. As a result, the cooling is prevented in an area where the cooling is not required according to a furniture displacement or an indoor space structure, thereby performing more efficient cooling.

In addition, it is possible to clearly recognize presence or absence of the user located indoors by photographing the indoor map to the 3D image. That is, it is possible to clearly determine the presence or absence of the user by acquiring the indoor image as the 3D image. As a result, it is possible to perform intensive cooling in an area where the users are distributed or the users are dense.

When the map for the indoor structure is photographed as the 3D image, it is possible to set a specific indoor area as the hotspot area on the basis of a predetermined condition (S1120).

Specifically, the hotspot area can refer to an area where there is a high possibility that the users are to be dense or an area where there is a high probability that the users are mainly to be distributed based on the picture or image photographed by the image photographing device 150 and can be set through learning.

On the other hand, it is possible to generate a structural map for the structure disposed indoors on the basis of the map acquired by the image photographing device 150 and the set hotspot area (S1130). The structural map can refer to information about a location of a wall, displacement of furniture, and an area where the user is mainly distributed based on an electronic apparatus controlling cooling or heating. By the structural map, cooling or heating is prevented in an area where the cooling or heating is not required, thereby performing more efficient cooling or heating.

In addition, the structural map is generated by the indoor map having the 3D structure acquired above, thereby acquiring a more accurate indoor structure. Therefore, it is possible to minimize the air from being discharged for cooling or heating to an unnecessary area.

As such, when the structural map is generated, the user located indoors can be detected by the image photographing device 150 (S1400). In other words, the user determines whether the user is located in the hotspot area set by a predetermined condition.

Thus, after detecting the user located indoors, it is determined whether the detected user is distributed in the hotspot area (S1500). At this time, it is determined that the user is distributed in the hotspot area and the distribution of the distributed user is a predetermined distribution or more (S1600). When the user distribution is the predetermined distribution or more, the cooling or heating in the hotspot area is controlled (S1700).

Meanwhile, when controlling the cooling or heating of the hotspot area, it is possible to control an indoor temperature by a difference between the temperature of the hotspot area and the temperature of the area other than the hotspot area. That is, the user presets an average temperature in the hotspot area where the user mainly moves and controls a heating or cooling electronic apparatus disposed indoors when the temperature in the hotspot area measured by the temperature measurer 111 is higher or lower than a predetermined average temperature.

Meanwhile, information about the temperature in the area other than the hotspot area can be pre-stored in the memory 140. As described above, a temperature in the furnished area or the area where the users are not distributed can be measured and an average temperature can be stored. A difference between the stored average temperature in the area other than the hotspot area and the measured temperature in the hotspot area can be analyzed. When a predetermined temperature difference occurs, the hotspot area is intensively cooled or heated at the analyzed average temperature.

Unlike this, a reference distribution is determined by the number of persons and the indoor temperature can be also controlled when a predetermined number or more of persons are dense.

Further, when the cooling or heating of the hotspot area is controlled, it is possible to intensively cool or heat the hotspot area for a predetermined time.

In other words, in general, even when the difference between the temperature in the hotspot area and the temperature in the area other than the hotspot area does not greatly occur and cooling is required by a difference between outdoor and indoor temperatures, it is determined that the cooling is not required while the cooling continues for the predetermined time. Therefore, it is possible to reduce the inconvenience of the user due to the cooling by stopping intensive cooling (or intensive heating) of the hotspot area.

Meanwhile, when the cooling or heating of the hotspot area is controlled, the user distribution in the hotspot area cannot be determined or the user distribution in the hotspot area can be less than a predetermined distribution. In this case, any one of the cooling or heating electronic apparatuses disposed indoors can control the cooling or heating in the entire interior.

In other words, an indoor map is acquired by photographing an area where the users are distributed in the indoor space by the image photographing device 150, a structural map for a plurality of structures disposed indoors is generated based on the photographed map, and then it can be determined as a case where the users are not distributed in the hotspot area set based on a predetermined condition. In this case, the electronic apparatus can control the cooling or heating in the entire indoor area without controlling the heating or cooling of a specific area (S1800).

At this time, the discharge range and setting of the cooled or heated air discharged from the heating or cooling apparatus can be changed based on the structural map acquired by the image photographing device 150 and can be set based on a condition that the cooling and heating efficiency can be higher.

FIG. 9 is a view for describing a deep neural network model for determining the control of an electronic apparatus according to an embodiment of the present disclosure.

In order to control an indoor temperature in the hotspot area where the activities of the user are concentrated or the distribution of the user is high, a pre-trained deep neural network model can also be used using AI machine learning so as to determine whether an area of controlling the temperature is the hotspot area.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, the machine learning can be a technology for researching and constructing a system for learning, predicting, and improving its own performance based on empirical data and an algorithm for the same. The algorithms of the machine learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network can include a model that represents the probabilistic relationship (conditional independence) among a set of variables. Bayesian network can be appropriate for data mining via unsupervised learning.

The SVM can include a supervised learning model for pattern detection and data analysis, heavily used in classification and regression analysis.

The ANN is a data processing system modeled after the mechanism of biological neurons and interneuron connections, in which a number of neurons, referred to as nodes or processing elements, are interconnected in layers.

The ANNs are models used in machine learning and can include statistical learning algorithms conceived from biological neural networks (particularly of the brain in the central nervous system of an animal) in machine learning and cognitive science.

Specifically, the ANNs can refer generally to models that have artificial neurons (nodes) forming a network through synaptic interconnections, and acquires problem-solving capability as the strengths of synaptic interconnections are adjusted throughout training.

The terms 'artificial neural network' and 'neural network' can be used interchangeably herein.

An ANN can include a number of layers, each including a number of neurons. In addition, the ANN can include the synapse for connecting between neuron and neuron.

The ANN can be defined by the following three factors: (1) a connection pattern between neurons on different layers; (2) a learning process that updates synaptic weights; and (3) an activation function generating an output value from a weighted sum of inputs received from a previous layer.

The ANNs can include, but are not limited to, network models such as a deep neural network (DNN), a recurrent neural network (RNN), a bidirectional recurrent deep neural network (BRDNN), a multilayer perception (MLP), and a convolutional neural network (CNN).

The ANN can be classified as a single-layer neural network or a multi-layer neural network, based on the number of layers therein.

In general, a single-layer neural network can include an input layer and an output layer.

In general, the multi-layer neural network can include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer can be a representative artificial neural network which enables deep learning, which is one machine learning technique.

The ANN can be trained using training data. Here, the training can refer to the process of determining parameters of the artificial neural network by using the training data, to perform tasks such as classification, regression analysis, and clustering of inputted data. Representative examples of parameters of the artificial neural network can include synaptic weights and biases applied to neurons.

An artificial neural network trained using training data can classify or cluster inputted data according to a pattern within the inputted data.

Throughout the present specification, an artificial neural network trained using training data can be referred to as a trained model.

Herein below, a learning method of the artificial neural network will be described.

The learning paradigms, in which an artificial neural network operates, can be classified into supervised learning, unsupervised learning, semi-supervised learning, and reinforcement learning.

Supervised learning is a machine learning method that derives a single function from the training data.

Among the functions that can be thus derived, a function that outputs a continuous range of values can be referred to as a regressor, and a function that predicts and outputs the class of an input vector can be referred to as a classifier.

In supervised learning, an artificial neural network can be trained with training data that has been given a label.

Here, the label can refer to a target answer (or a result value) to be guessed by the artificial neural network when the training data is inputted to the artificial neural network.

Throughout the present specification, the target answer (or a result value) to be guessed by the artificial neural network when the training data is inputted can be referred to as a label or labeling data.

Throughout the present specification, assigning one or more labels to training data in order to train an artificial neural network can be referred to as labeling the training data with labeling data.

Training data and labels corresponding to the training data together can form a single training set, and as such, they can be inputted to an artificial neural network as a training set.

The training data can exhibit a number of features, and the training data being labeled with the labels can be interpreted as the features exhibited by the training data being labeled with the labels. In this case, the training data can represent a feature of an input object as a vector.

Using training data and labeling data together, the artificial neural network can derive a correlation function between the training data and the labeling data. Then, through evaluation of the function derived from the artificial neural network, a parameter of the artificial neural network can be determined (optimized).

The unsupervised learning is a machine learning method that learns from training data that has not been given a label.

More specifically, the unsupervised learning can be a learning method that learns an artificial neural network to discover a pattern within given training data and perform classification by using the discovered pattern, rather than by using a correlation between given training data and labels corresponding to the given training data.

Examples of the unsupervised learning can include clustering and independent component analysis.

Examples of the artificial neural network using the unsupervised learning can include a generative adversarial network (GAN) and an autoencoder (AE).

The GAN is a machine learning method in which two different artificial intelligences, a generator and a discriminator, improve performance through competing with each other.

The generator can be a model creating new data that generate new data based on true data.

The discriminator can be a model recognizing patterns in data that determines whether inputted data is from the true data or from the new data generated by the generator.

Furthermore, the generator can receive and learn data that has failed to fool the discriminator, while the discriminator can receive and learn data that has succeeded in fooling the discriminator. Accordingly, the generator can evolve so as to fool the discriminator as effectively as possible, while the discriminator can evolve so as to distinguish, as effectively as possible, between the true data and the data generated by the generator.

An auto-encoder (AE) is a neural network which aims to reconstruct its input as output.

More specifically, AE can include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer can be inputted to the output layer. In this case, since the number of nodes in the output layer is greater than the number of nodes in the hidden layer, the dimensionality of the data increases, thus data decompression or decoding can be performed.

Furthermore, in the AE, the inputted data can be represented as hidden layer data as interneuron connection strengths are adjusted through learning. The fact that when representing information, the hidden layer is able to reconstruct the inputted data as output by using fewer neurons than the input layer can indicate that the hidden layer has discovered a hidden pattern in the inputted data and is using the discovered hidden pattern to represent the information.

The semi-supervised learning is machine learning method that makes use of both labeled training data and unlabeled training data.

One semi-supervised learning technique involves reasoning the label of unlabeled training data, and then using this reasoned label for learning. This technique can be used advantageously when the cost associated with the labeling process is high.

Reinforcement learning can be based on a theory that given the condition under which a reinforcement learning agent can determine what action to choose at each time instance, the agent can find an optimal path based on experience without reference to data.

The reinforcement learning can be performed primarily by a Markov decision process (MDP).

The Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network can be determined by a number of factors, including the number of hidden layers, the number of hidden nodes included in each hidden layer, input feature vectors, target feature vectors, and so forth.

The hyperparameters can include various parameters which need to be initially set for learning, much like the initial values of model parameters. Also, the model parameters can include various parameters sought to be determined through learning.

For instance, the hyperparameters can include initial values of weights and biases between nodes, mini-batch size, iteration number, learning rate, and so forth. Furthermore, the model parameters can include a weight between nodes, a bias between nodes, and so forth.

The loss function can be used as an index (reference) in determining an optimal model parameter during the learning process of an artificial neural network. Learning in the artificial neural network involves a process of adjusting model parameters so as to reduce the loss function, and the purpose of learning can be to determine the model parameters that minimize the loss function.

The loss functions typically use means squared error (MSE) or cross entropy error (CEE), but the present disclosure is not limited thereto.

A cross-entropy error can be used when a true label is one-hot encoded. The one-hot encoding can include an encoding method in which among given neurons, only those corresponding to a target answer are given 1 as a true label value, while those neurons that do not correspond to the target answer are given 0 as a true label value.

In machine learning or deep learning, learning optimization algorithms can be used to minimize a cost function, and examples of such learning optimization algorithms can include gradient descent (GD), stochastic gradient descent (SGD), momentum, Nesterov accelerate gradient (NAG), Adagrad, AdaDelta, RMSProp, Adam, and Nadam.

The GD includes a method that adjusts model parameters in a direction that decreases the output of a cost function by using a current slope of the cost function.

The direction in which the model parameters are to be adjusted can be referred to as a step direction, and a size to be adjusted can be referred to as a step size.

Here, the step size can mean a learning rate.

The GD obtains a slope of the cost function through use of partial differential equations, using each of model parameters, and updates the model parameters by adjusting the model parameters by a learning rate in the direction of the slope.

The SGD can include a method that separates the training dataset into mini batches, and by performing gradient descent for each of these mini batches, increases the frequency of gradient descent.

Adagrad, AdaDelta and RMSProp can include methods that increase optimization accuracy in SGD by adjusting the step size. In the SGD, the momentum and NAG can also include methods that increase optimization accuracy by adjusting the step direction. Adam can include a method that combines momentum and RMSProp and increases optimization accuracy in SGD by adjusting the step size and step direction. Nadam can include a method that combines NAG and RMSProp and increases optimization accuracy by adjusting the step size and step direction.

Learning rate and accuracy of an artificial neural network can include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the hyperparameters can be set to various values experimentally to learn artificial neural networks, and can be set to optimal values that provide stable learning rate and accuracy of the learning result.

The estimation of a state of the object to be heated can be more sophisticated using the above methods.

In the embodiment of the present disclosure, various methods can be present to create a deep neural network model for use, but in map learning, the following training process can be performed as a pre-operation.

The processor 110 of the electronic apparatus can configure a learning data set to determine whether the area controlling the temperature is the hotspot area, in order to control the indoor temperature in the hotspot area where the activities of the user are concentrated or the distribution of the user is high.

When the deep neural network model is trained by the trained data, the trained learning model then reflects the characteristics of the hotspot area to control the cooling or heating of the hotspot area set, so that it can correspond to the indoor temperature set by the user.

The user gives continuous feedback about the determining result of the deep neural network model, thereby more sophisticating the learning model.

The example embodiments described above can be implemented through computer programs executable through various components on a computer, and such computer programs can be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs can be those specially designed and constructed for the purposes of the present disclosure or they can be of the kind well known and available to those skilled in the computer software arts. Examples of computer programs can include both machine codes, such as produced by a compiler, and higher-level codes that can be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps can be performed in any suitable order, unless expressly indicated otherwise. In other words, the present disclosure is not necessarily limited to the order in which the individual steps are recited. Also, the steps included in the methods according to the present disclosure can be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A controlling method of an electronic apparatus for managing cooling or heating in an interior of a building, the method comprising:

acquiring an indoor map of the interior by an image photographing device;

based on a predetermined condition, setting a specific area of the interior as a hotspot area;

generating a structural map of the interior based on the acquired map and the set hotspot area;

detecting one or more users located in the interior by the image photographing device;

determining whether the one or more users are distributed in the hotspot area; and based on determination that the distribution of the one or more users in the hotspot area is a predetermined distribution or more, controlling cooling or heating of the hotspot area using the electronic apparatus disposed in the interior, wherein the controlling of the cooling or heating of the hotspot area comprises:

measuring a temperature in the hotspot area and a temperature in an area other than the hotspot area;

analyzing a difference between the temperature in the hotspot area and the temperature in the area other than the hotspot area; and based on determination that the temperature in the hotspot area has a difference of a predetermined temperature or more from the temperature in the area other than the hotspot area, controlling the electronic apparatus disposed in the interior to perform a cooling or heating operation toward the hotspot area, wherein the controlling of the cooling or heating of the hotspot area further comprises:

controlling the cooling or heating of the hotspot area for a predetermined time;

detecting the temperature in the hotspot area after the predetermined time; and based on determination that the temperature in the hotspot area has the difference of a predetermined temperature or more from the temperature in the hotspot area after the predetermined time, controlling at least a portion of cooling or heating electronic apparatuses disposed in the interior to perform a cooling or heating operation toward the hotspot area.

2. The controlling method of the electronic apparatus of claim 1, wherein the temperature in the area other than the hotspot area is information pre-stored in a memory of the electronic apparatus, and wherein a difference between the pre-stored temperature in the area other than the hotspot area and the temperature in the hotspot area is analyzed during the analyzing of the difference between the temperature in the hotspot area and the temperature in the area other than the hotspot area stored in the memory.

3. The controlling method of the electronic apparatus of claim 1, wherein the controlling of the cooling or heating of the hotspot area comprises:

based on determination that the distribution of the one or more users in the hotspot area cannot be determined or the distribution of the one or more users in the hotspot area is less than a predetermined distribution, controlling the at least a portion of cooling or heating electronic apparatuses disposed in the interior to perform a cooling or heating operation for the entire interior.

4. The controlling method of the electronic apparatus of claim 1, wherein the acquiring of the indoor map further comprises acquiring a 3D structure of the indoor maps by the image photographing device.

5. The controlling method of the electronic apparatus of claim 4, wherein the indoor map includes an indoor space map and information about shapes and locations of structures disposed in the interior.

6. The controlling method of the electronic apparatus of claim 4, wherein the setting of the hotspot area comprises:

based on shapes and locations of structures disposed in the interior, determining a hotspot location having a high probability that the one or more users remain for a predetermined time or more; and setting the hotspot area in the indoor map according to the hotspot location.

7. The controlling method of the electronic apparatus of claim 4, wherein the setting of the hotspot area comprises:

inputting shapes and locations of structures disposed indoors in a first neural network model pre-trained so as to predict a probability that the one or more users for a predetermined time or more according to a shape and a location of a structure disposed at home; and setting a location having a probability of a predetermined value or more as the hotspot area according to an output of the first neural network model.

8. A controlling method of an electronic apparatus for managing cooling or heating in an interior of a building, the method comprising:

acquiring an indoor map of the interior by an image photographing device;

based on a predetermined condition, setting a specific area of the interior as a hotspot area;

generating a structural map of the interior based on the acquired map and the set hotspot area;

detecting one or more users located in the interior by the image photographing device;

determining whether the one or more users are distributed in the hotspot area; and based on determination that the distribution of the one or more users in the hotspot area is a predetermined distribution or more, controlling cooling or heating of the hotspot area using the electronic apparatus disposed in the interior, wherein the controlling of the cooling or heating of the hotspot area comprises:

controlling the cooling or heating of the hotspot area for a predetermined time;

detecting the temperature in the hotspot area after the predetermined time; and based on determination that the distribution of the one or more users in the hotspot area cannot be determined or the distribution of the one or more users in the hotspot area is less than a predetermined distribution, controlling at least a portion of cooling or heating electronic apparatuses disposed in the interior to perform a cooling or heating operation for the entire interior.

9. A controlling method of an electronic apparatus for managing cooling or heating in an interior of a building, the method comprising:

acquiring an indoor map of the interior by an image photographing device;

based on a predetermined condition, setting a specific area of the interior as a hotspot area, wherein the setting of the hotspot area comprises:

inputting shapes and locations of structures disposed indoors in a first neural network model pre-trained so as to predict a probability that the one or more users for a predetermined time or more according to a shape and a location of a structure disposed at home; and setting a location having a probability of a predetermined value or more as the hotspot area according to an output of the first neural network model;

generating a structural map of the interior based on the acquired map and the set hotspot area;

detecting one or more users located in the interior by the image photographing device;

determining whether the one or more users are distributed in the hotspot area;

based on determination that the distribution of the one or more users in the hotspot area is a predetermined distribution or more, controlling cooling or heating of the hotspot area using the electronic apparatus disposed in the interior;

predicting a temperature in the hotspot area by a second neural network model pre-trained to predict the temperature of the corresponding area according to the distribution of the one or more users in the interior; and controlling at least a portion of the cooling or heating electronic apparatuses disposed indoors to perform a cooling or heating operation toward the hotspot area based on an output from the second neural network model.

10. An electronic apparatus capable of controlling cooling or heating management in an interior of a building, the electronic apparatus comprising:

a map acquirer configured to acquire an indoor map of the interior by an image photographing device; and a processor configured to set a specific area of the interior as a hotspot area based on a predetermined condition, generate a structural map in the interior based on the acquired map and the set hotspot area, detect one or more users located in the interior by the image photographing device, determine whether the one or more users are distributed in the hotspot area, and control cooling or heating of the hotspot area by a control of the electronic apparatus disposed in the interior when the distribution of the one or more users in the hotspot area is a predetermined distribution or more, wherein the controlling of the cooling or heating of the hotspot area comprises:

measuring a temperature in the hotspot area and a temperature in an area other than the hotspot area;

analyzing a difference between the temperature in the hotspot area and the temperature in the area other than the hotspot area; and based on determination that the temperature in the hotspot area has a difference of a predetermined temperature or more from the temperature in the area other than the hotspot area, controlling the electronic apparatus disposed in the interior to perform a cooling or heating operation toward the hotspot area, wherein the controlling of the cooling or heating of the hotspot area further comprises:

controlling the cooling or heating of the hotspot area for a predetermined time;

detecting the temperature in the hotspot area after the predetermined time; and based on determination that the temperature in the hotspot area has the difference of a predetermined temperature or more from the temperature in the hotspot area after the predetermined time, controlling at least a portion of cooling or heating electronic apparatuses disposed in the interior to perform a cooling or heating operation toward the hotspot area.

11. The electronic apparatus of claim 10, wherein the processor comprises:

a temperature measurer configured to measure a temperature in the hotspot area and a temperature in an area other than the hotspot area; and an analyzer configured to analyze a difference between the temperature in the hotspot area and the temperature in the area other than the hotspot area, wherein the processor controls the at least a portion of cooling or heating electronic apparatuses disposed in the interior to perform a cooling or heating operation toward the hotspot area when the temperature in the hotspot area has a difference of a predetermined temperature or more from the temperature in the area other than the hotspot area.

12. The electronic apparatus of claim 11, wherein the processor includes a memory configured to store information about the temperature in the area other than the hotspot area, and wherein the analyzer further analyzes a difference between the temperature in the area other than the hotspot area that is stored in the memory and the temperature in the hotspot area.

13. The electronic apparatus of claim 10, wherein the processor controls the at least a portion of cooling or heating electronic apparatuses disposed in the interior to perform a cooling or heating operation for the entire interior when the distribution of the one or more users in the hotspot area cannot be determined or the distribution of the one or more users in the hotspot area is less than a predetermined distribution.

14. The electronic apparatus of claim 10, wherein the map acquirer acquires the indoor map as a 3D image by the image photographing device.

15. The electronic apparatus of claim 14, wherein the indoor map includes an indoor space map and information about shapes and locations of structures disposed in the interior.

* * * * *